May 6, 1958  J. VERHOEFF  2,833,155
WORM GEAR
Filed June 27, 1955
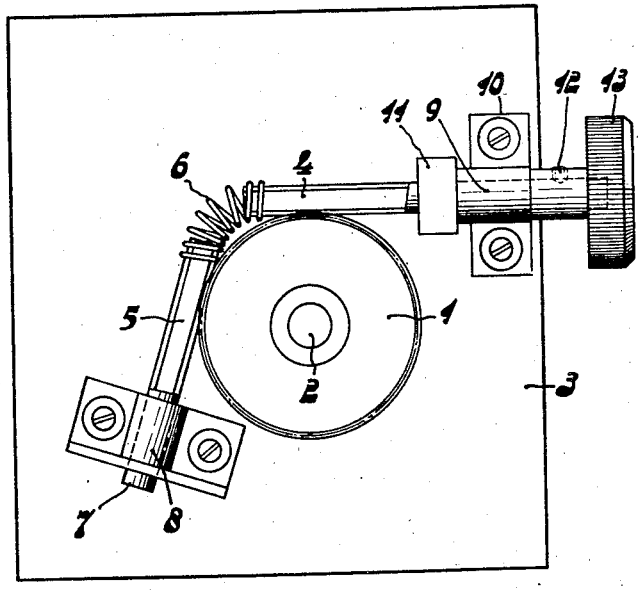
INVENTOR
JACOB VERHOEFF
BY
AGENT

United States Patent Office 2,833,155
Patented May 6, 1958

2,833,155
WORM GEAR

Jacob Verhoeff, Hilversum, Netherlands, assignor, by mesne assignments, to North American Philips Company, Inc., New York, N. Y., a corporation of Delaware Application June 27, 1955, Serial No. 518,030

Claims priority, application Netherlands July 2, 1954

3 Claims. (Cl. 74—427)

It is difficult and costly to design and manufacture worm gears, comprising a worm and a worm wheel, in such manner that there is substantially no backlash between the worm and the worm wheel in both senses of rotation of the worm. Usually the worm has a comparatively considerable backlash on starting it. Many different constructions are known to cure this evil. The invention has for its object to provide a construction of this type, in which the backlash is small in both senses of rotation and which has the advantage of being simple and easy to manufacture.

In accordance with the invention, a worm gear comprising a worm and a worm wheel is characterized in that the worm comprises two parts in angular relationship, which parts are both meshed with the worm wheel and connected together through a helical spring, the directly driven part not being axially movable relatively to the worm wheel during operation, whereas the second part is axially movable.

In order that the invention may be readily carried into effect, it will now be described with reference to the accompanying drawing, in which one embodiment of the invention is given by way of example, and in which the reference numeral 1 denotes a worm wheel mounted on a shaft 2 which is rotatable in a mounting plate 3. Two worms 4 and 5 are both meshed with the worm wheel 1. These worms are connected together through a helical spring 6. The shaft 7 of worm 5 is supported in a bearing 8 wherein it is axially slidable. The worm 4 comprises a shaft 9 which is supported in a bearing 10 but not slidable therein on account of a collar 11 seated on the shaft 9 on the one hand and on the other hand of a knob 13 secured by means of a set screw 12, said parts resting at both sides against the bearing 10. The helical spring 6 tends to draw the worms 4 and 5 together. Since, however, only the worm 5 is axially slidable, the two worm parts engage differently located sides of the teeth in a given sense of rotation of the worm wheel 1. It is evident that, in this manner, backlash of the worms 4 and 5 relative to the worm wheel 1 is completely removed, so that the worm wheel 1 is immediately entrained on turning the knob 13 in either sense of rotation. Alternatively, the helical spring 6 may exert a push force instead of pull force, but the operation of the transmission remains unchanged, as may be easily seen.

The construction described is primarily suitable for transmitting low powers. It may, for example, be used for adjusting tuning members in telecommunication apparatus, measuring instruments or the like, where fine adjustment is often desired in two senses of rotation, with a minimum amount of backlash in both senses.

What is claimed is:

1. A worm gear comprising a worm wheel, a worm including two separate parts, both of said parts being meshed with said worm wheel in angular relation, a helical spring means connecting said worm parts, means fixing one of said parts against axial movement, means mounting said other part for axial movement, and means for rotating one of said worm parts.

2. A worm gear as set forth in claim 1 wherein said means for rotating one of said worm parts rotates the worm part which is fixed against axial movement.

3. A worm gear as set forth in claim 1 wherein said helical spring connects two adjacent ends of said separate worm parts.

References Cited in the file of this patent

FOREIGN PATENTS 171,790    Austria _____ Dec. 15, 1951